US012688946B2

(12) United States Patent
Cucchi et al.

(10) Patent No.: US 12,688,946 B2
(45) Date of Patent: Jul. 21, 2026

(54) ELECTRONIC COMPONENT AND METHOD OF MANUFACTURING AN ELECTRONIC COMPONENT

(71) Applicant: Technische Universitat Dresden, Dresden (DE)

(72) Inventors: Matteo Cucchi, Dresden (DE); Hans Kleemann, Dresden (DE); Karl Leo, Dresden (DE)

(73) Assignee: TECHNISCHE UNIVERSITAT DRESDEN (DE)

( * ) Notice: Subject to any disclaimer, the term of this patent is extended or adjusted under 35 U.S.C. 154(b) by 888 days.

(21) Appl. No.: 18/001,749

(22) PCT Filed: May 31, 2021

(86) PCT No.: PCT/EP2021/064535
§ 371 (c)(1),
(2) Date: Dec. 14, 2022

(87) PCT Pub. No.: WO2021/254769
PCT Pub. Date: Dec. 23, 2021

(65) Prior Publication Data

US 2023/0237319 A1 Jul. 27, 2023

(30) Foreign Application Priority Data

Jun. 15, 2020 (DE) ..................... 10 2020 115 713.4

(51) Int. Cl.
*H01B 1/12* (2006.01)

(52) U.S. Cl.
CPC .................................... *H01B 1/127* (2013.01)

(58) Field of Classification Search
CPC ......... H01B 1/127; H10K 10/50; G06N 3/065
See application file for complete search history.

(56) References Cited

U.S. PATENT DOCUMENTS 5,930,162 A 7/1999 Peterson
2014/0190730 A1* 7/2014 Frey .......................... D01F 6/44
174/257

(Continued)

FOREIGN PATENT DOCUMENTS

DE 102019127005 A1 4/2021
EP 0968536 B1 11/2003
WO 2021069298 A1 4/2021

OTHER PUBLICATIONS

Gerasimov et al., "An Evolvable Organic Electrochemical Transistor for Neuromorphic Applications", Adv. Sci. 2019, pgs.

(Continued)

*Primary Examiner* — Steven B Gauthier
*Assistant Examiner* — Marc-Anthony Armand
(74) *Attorney, Agent, or Firm* — Barnes & Thornburg LLP; Jeffrey R. Stone

(57) ABSTRACT

Disclosed herein are methods, devices, and systems for electronic components that may be or be part of an artificial neural network. The electronic component may include a substrate that has a plurality of input electrodes and a plurality of output electrodes disposed on and/or within the substrate, where the electrodes have a separation from one another. The electronic component may also include an electrically conductive network of one or more electrically conductive polymers. The electrically conductive network may be configured to electrically crosslink the plurality of input electrodes to the plurality of output electrodes.

18 Claims, 8 Drawing Sheets

(56) References Cited

U.S. PATENT DOCUMENTS

| | | | |
|---|---|---|---|
| 2019/0213557 | A1 | 7/2019 | Bahar |
| 2019/0214557 | A1 | 7/2019 | Bahar |
| 2020/0118623 | A1 | 4/2020 | Meredith et al. |

OTHER PUBLICATIONS

Van De Burgt, et al., "A non-volatile organic electrochemical device as a low-voltage artificial synapse for neuromorphic computing", Nature Materials, vol. 16, Apr. 2017, p. 414-418.
Koizumi et al., "Electropolymerization on wireless electrodes towards conducting polymer microfibre networks", nature communications, Received Jul. 28, 2015, Accepted Dec. 7, 2015, Published Jan. 25, 2016, 6 pgs.
Pecqueur et al., "Perspective: Organic electronic materials and devices for neuromorphic engineering", Journal of Applied Physics 124, 151902 (2018).
First Office Action issued in European Patent Application No. 21 730 542.4 dated Jun. 20, 2025. For informational purposes only.
Second Office Action issued in German Patent Application No. 10 2020 115 713.4 dated Mar. 27, 2025. For informational purposes only.

* cited by examiner

ELECTRONIC COMPONENT AND METHOD OF MANUFACTURING AN ELECTRONIC COMPONENT

CROSS-REFERENCE TO RELATED APPLICATION(S)

This application is a national phase application of PCT/EP2021/064535 filed on May 31, 2021 that claims priority to German Patent Application No. 10 2020 115 713.4 filed on Jun. 15, 2020, the contents of both of which are fully incorporated herein by reference.

TECHNICAL FIELD

Various embodiments relate to an electronic component and a method of manufacturing an electronic component.

BACKGROUND

Artificial neural nets (also referred to as artificial neural networks), for example, are networks of artificial neurons. Currently, artificial neural networks represent a basic building block of artificial intelligence. Such networks are characterized, for example, by high interconnectivity between different network points, the artificial neurons. Furthermore, the basic principle is based, for example, on the fact that the network should be able to learn and form new connections between the artificial neurons for this purpose. In general, ways are being sought to mimic the functions of natural neurons and synapses, and ultimately to attempt to artificially reproduce natural neuromorphic mechanisms.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1A:
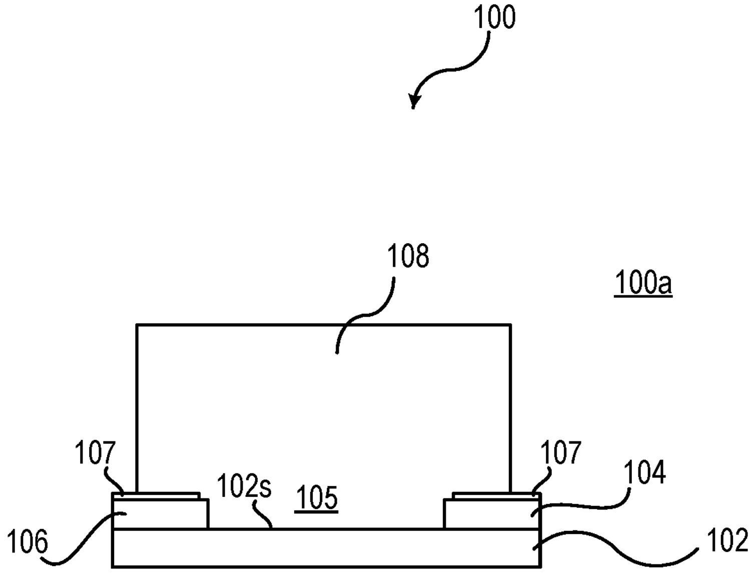
FIGS. 1A and 1B show an electronic component in a schematic cross-sectional view, according to various embodiments.

In the following detailed description, reference is made to the accompanying drawings, in which specific details and embodiments in which the invention may be practiced are shown for illustrative purposes. It is understood that other embodiments may be used and structural or logical changes may be made without departing from the scope of protection of the present invention. It is understood that the features of the various exemplary embodiments described herein may be combined, unless specifically indicated otherwise. Therefore, the following description is not to be construed in a limiting sense, and the scope of protection of the present invention is defined by the appended claims.

Various embodiments relate to an electronic component suitably configured to artificially reproduce neuromorphic mechanisms.

According to various embodiments, the electronic component may be configured such that the polymer conductor tracks are selectively grown on a substrate by means of a floating electrode between two or more than two input electrodes and output electrodes. The connections of this artificial neural network may, according to various embodiments, be influenced (e.g., selectively adjusted) by means of the freely movable electrode.

According to various embodiments, an electronic component and a method for fabricating the electronic component are provided, the method comprising selectively forming electrical connections between electrodes. The electrical connections may then be programmed and reprogrammed in a neural network. The neural network is configured to perform nonlinear transformations of inputs.

According to various embodiments, a directed growth of an electrical connection between two or more than two electrodes (e.g., between a plurality of electrodes that may act, for example, as nodes of an artificial neural network) is generated from polymer fibers using electropolymerization.

Various embodiments relate to an electronic component comprising, for example, a substrate. A plurality of input electrodes and a plurality of output electrodes are disposed on and/or in the substrate with a separation from each other. The electronic component further comprises an electrically conductive network of one or more electrically conductive polymers, wherein the electrically conductive network is configured to electrically crosslink the plurality of input electrodes to the plurality of output electrodes.

According to various embodiments, the electrically conductive polymer may comprise or consist of one or more fiber structures. For example, the one or more fiber structures may be linear or reticulated between the input electrodes and the output electrodes.

According to various embodiments, the polymerizable material may be a monomer of an intrinsically conductive polymer and/or a doped polymer. In this case, the electrically conductive polymer may then be the intrinsically conductive polymer and/or the doped polymer.

According to various embodiments, the electronic component may further comprise a suitable gate structure that allows the electrical conductivity of the established electrical connection to be influenced (e.g., selectively adjusted) by means of an electric field.

According to various embodiments, any further electrode may act as a gate structure provided in addition to the input electrodes and output electrodes. Alternatively, branches of the polymer fibers that are not directly connected to any of the output electrodes may each function as a gate structure.

According to various embodiments, the electronic component may have a metallization that allows the at least two electrodes or the electronic component to be connected to at least one biological nerve.

According to some embodiments, an artificial neural network is provided comprising or formed from one or more electronic components. For example, the artificial neural network is configured to perform at least one computing function by means of the one electronic component or by means of the plurality of electronic components.

According to various embodiments, a method of manufacturing an electronic component is provided, the method comprising, for example: providing an electrolytic material at least in a space region between a first electrode and a second electrode, wherein the first electrode is arranged on and/or in a substrate and the second electrode is arranged freely movable in the electrolytic material, wherein the second electrode is arranged with a separation from the first electrode and the substrate, and wherein the electrolytic material comprises at least one polymerizable material, forming at least one electrical connection between the first electrode and the second electrode by polymerizing the at least one polymerizable material to an electrically conductive polymer.

It is understood that a method described herein (e.g., a method of manufacturing an electronic component) may correspondingly include one or more method steps described herein with reference to functions of an apparatus (e.g., with reference to the electronic component), and vice versa.

According to various embodiments, an electronic component may include a substrate. For example, the substrate may have a planar surface and may serve, for example, as a carrier for electrodes or the like. The substrate may be, for example, mechanically rigid, e.g., rigid, inflexible, or fixed, or the substrate may be mechanically flexible, e.g., bendable, elastic, or movable. For example, a structure that is not physically connected to the electrodes of the electronic component described herein cannot be understood as a substrate.

As used herein, the term "electrical connection" may describe, for example, a structure embodied by an electrically conductive polymer. For example, the electrically conductive polymer extends between at least two electrodes and may be in physical contact with the at least two electrodes. According to various embodiments, an electrolyte (e.g., in the form of an electrolyte solution or a solid-state electrolyte) may be provided between at least one input electrode and at least one output electrode, wherein even though the electrolyte is electrically conductive to some extent, it is not understood to be an electrical connection.

The term "electrical compound" as used herein may describe, for example, a structure that provides electrical conductivity based on electron or hole conduction. For example, an electrolyte may be understood as an ionic conductor.

As used herein, the term "operating state" may be understood to mean, for example, a state of a functional electronic component. The operating state may be, for example, an idle state (off state, characterized, for example, by a lack of ability to transport charge carriers of the polymeric compound or by the absence of the polymeric compound) and an active state (on state, characterized, for example, by the ability to transport charge carriers of the polymeric compound and the presence of the polymeric compound), but may also extend beyond these states, regardless of whether the electronic component is supplied with electrical energy. Illustratively, the operating state of the electronic component may be maintained for at least a period of time (e.g., days, weeks, or months), for example, even without the supply of electrical energy. For example, a first operating state may be a state of the electronic component in which no electrical connection is provided by means of the electrically conductive polymer between at least one of the input electrodes and output electrodes. In this regard, a region between at least one input electrode and at least one output electrode may be substantially free of an electrically conductive polymer. The first operating state may be illustratively understood as, for example, a non-programmed or untrained state of the electronic component. A second operating state of the electronic component may be, for example, a state of the electronic component in which the electrical connection between at least one input electrode and at least one output electrode is established by means of the electrically conductive polymer. In this regard, the electrically conductive polymer may be physically and electrically connected to an input electrode and at least one output electrode. Illustratively, the second operating state may be understood as, for example, a programmed or trained state of the electronic component. According to various embodiments, the electronic component may be placed in one of a plurality of second states.

The term "plasticity" as used herein may be understood, for example, as a property (for example, electrical conductivity) of the electrical connection of the electronic component. This may be changed and adapted by stimulation, for example by means of an electrical signal, in accordance with the stimulation. Thus, illustratively, plasticity may be understood as a basic requirement for programming the electronic component.

According to various embodiments, stimulation of the network may be performed using an electrical signal such that the physical properties of the electrical connection between at least one input electrode and at least one output electrode change, for example, by becoming more branched, thicker, and/or more grown. Thus, the electrical properties of the electrical connection may change. For example, the electrical conductivity of the electrical connection may increase due to electrical stimulation.

According to various embodiments, a change in the electrical properties of the electrical connection may also be possible by absent stimulation, for example by means of an absent electrical signal, whereby the electrical connection may, for example, degrade. This may occur, for example, due to degradation and/or unraveling of the electrically conductive polymer comprising the electrical connection. Thus, for example, the electrical properties of the electrical connection may also change over time. For example, the electrical conductivity of the electrical connection may reduce over time.

The term "short-term plasticity" as used herein may be understood to include the order of magnitude of the time in which plasticity may change itself or be changed by means of stimulation. The same applies to the term "long-term plasticity" as used herein. According to various embodiments, the magnitude of time associated with short-term plasticity may be less than the magnitude of time associated with long-term plasticity. For example, the time associated with the short term plasticity may be less than 1 h, e.g., less than 1 min, e.g., less than 1 s. The time associated with long-term plasticity may be, for example, greater than 1 h, e.g., greater than 10 h, e.g., greater than 24 h.

Figure 1B:
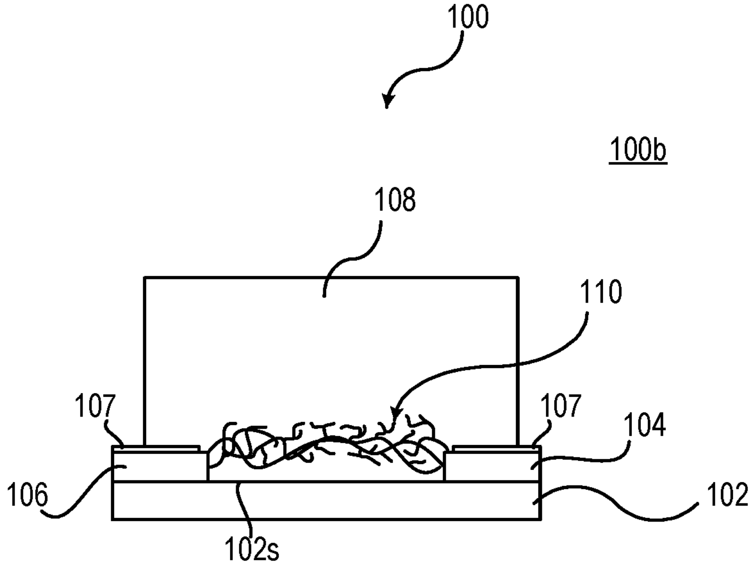
Figure 2A:
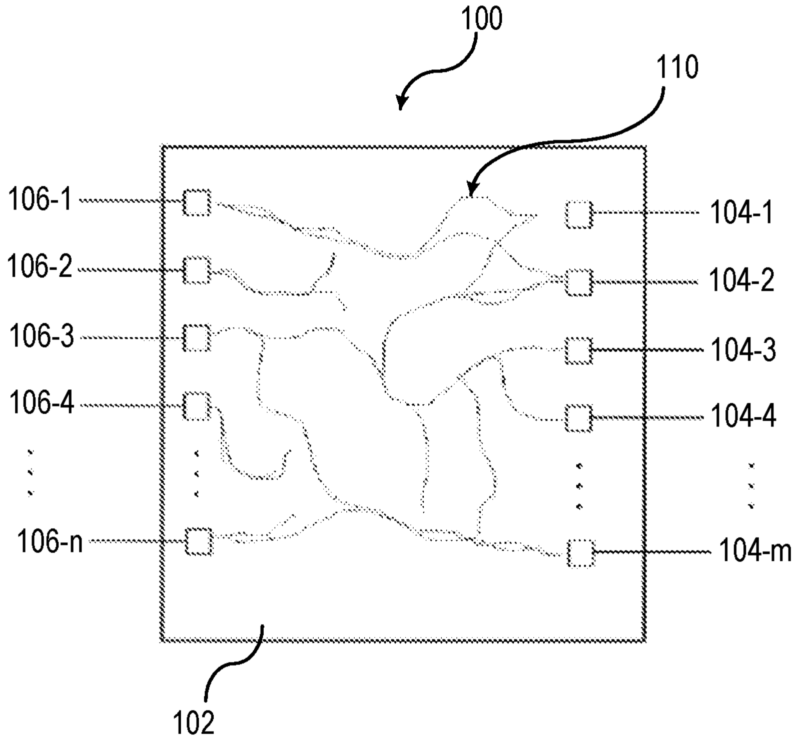
FIGS. 2A and 2B show an electronic component in a schematic top view, according to various embodiments.
Figure 2B:
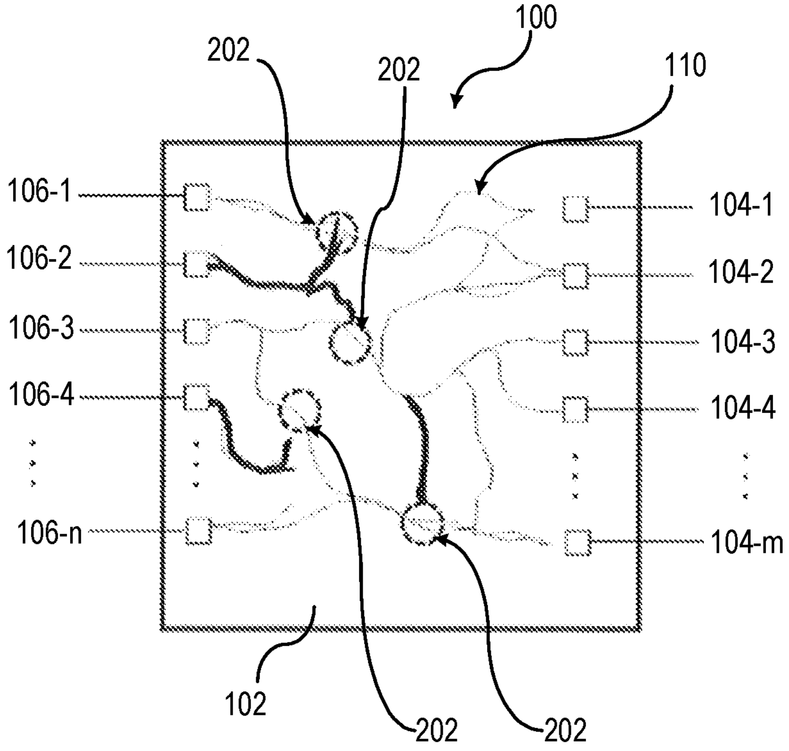

FIG. 1A and FIG. 1B illustrate an electronic component 100 in two mutually different operating states 100*a*, 100*b* in a schematic cross-sectional view, according to various embodiments. FIG. 2A and FIG. 2B illustrate an electronic component 100 in a schematic top view, according to various embodiments.

According to various embodiments, the electronic component 100 may include a substrate 102. The electronic component 100 or the substrate 102 of the electronic component 100 may include a plurality of input electrodes 104 and a plurality of output electrodes 106. The input electrodes 106 or 106-1, 106-2, 106-3, 106-4, 106-*n* or output electrodes 104 or 104-1, 104-2, 104-3, 104-4, 104*m* (n, m as integers of natural numbers) are respectively arranged on and/or in the substrate 102 with a separation from each other.

The substrate 102 may be, for example, a non-conductive substrate 102. For example, the substrate 102 may include an electrically semiconductive or electrically conductive portion, in which case the portion may be electrically isolated from the input electrodes 106 and the output electrodes 104 by means of at least one electrically insulating layer.

Figure 3:
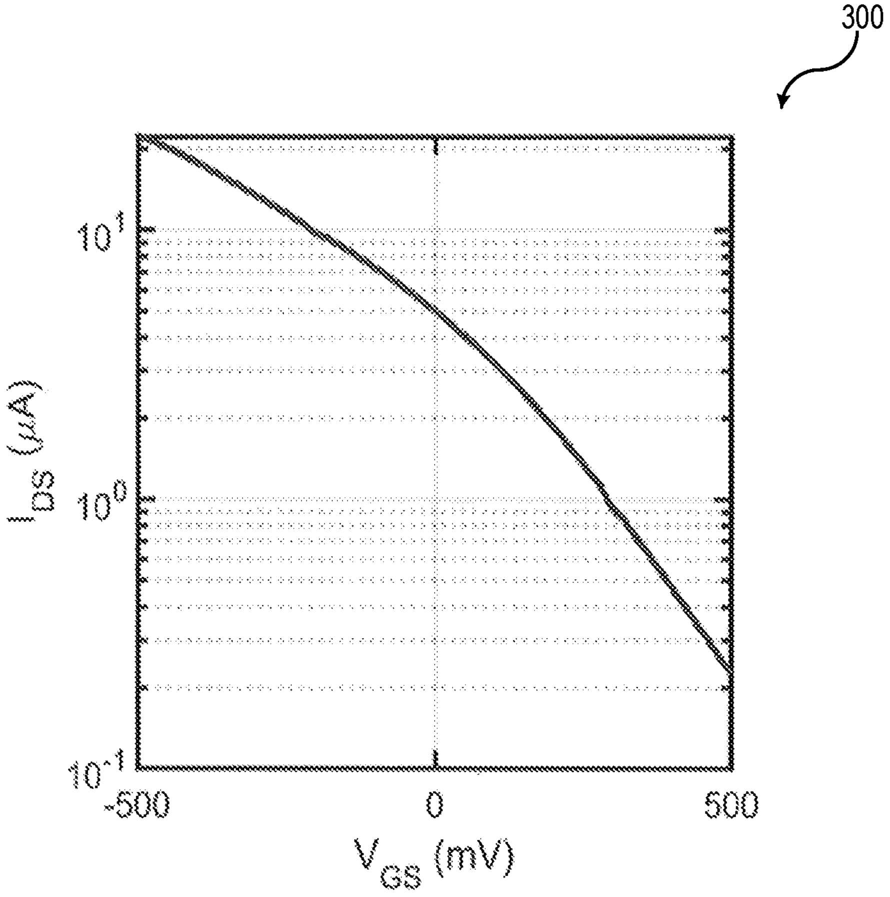
FIG. 3 shows a graph of a conductivity of an electrical connection as a function of the voltage of an electrical signal for an electronic component, according to various embodiments.

An electrically conductive network 110 of one or more electrically conductive polymers or polymer fibers is configured to electrically interconnect the plurality of input electrodes 106 to the plurality of output electrodes 104. The electrically conductive polymer(s) fibers may be at least partially interconnected and/or spaced apart. Spaced electrically conductive polymers may be electrically insulated from each other or, alternatively, may act on each other (for example, act as a gate structure) by means of electric fields. By means of the gate action of the polymer fibers on each other, a non-linear output may be realized, as illustrated in FIG. 3.

Alternatively or additionally, one or more gate electrodes may be provided, for example, in the electrolytic material 108 and spaced apart from the electrically conductive network 110. By means of the one or more gate electrodes, a nonlinear response/output to a signal applied to the input electrodes may be generated at the output electrodes. A gate electrode may affect current flow in an electrically conductive polymer fiber or network 110 in a nonlinear manner. Similarly, adjacent polymer fibers of the electrically conductive network 110 may affect each other in a nonlinear manner, for example, when signals of different voltages are applied to the polymer fibers.

According to various embodiments, a conductive substrate (e.g., a substrate having ionic conductivity) may assume or partially assume the role of an electrolytic material. Further, for example, electrical insulation (e.g., a layer of electrically insulating material) may optionally be provided on or over the conductive substrate 102.

In various embodiments, the electrolyte or electrolytic material that surrounds the electrically conductive network 110 and causes the nonlinear conductivity (FIG. 3) may be a liquid, gel, resin, or solid electrolyte, for example, an electrolyte material 108 disposed at least partially in the chamber between the plurality of input electrodes 106 and the plurality of output electrodes 104, wherein one or more electrically conductive polymer fibers are disposed at least partially in the liquid, gel, or resin, respectively.

Illustratively, any number or plurality of input electrodes 106 are electrically conductively connected to any number or plurality of output electrodes 104 through the electrically conductive network 110. The electrically conductive network 110 is formed of electrically conductive organic material, such as an electrically conductive polymer (a plurality of polymer molecules or polymer fibers). The network 110 may be random or randomly formed, or configured according to a predetermined structure.

When the electronic component 100 is in a second operational state, see for example FIG. 1B, at least one electrical connection may be made between the input electrodes 106 and output electrodes 104. The at least one electrical connection may include or be formed from, for example, an electrically conductive polymer. The electrically conductive polymer may be or may be formed by the polymerizable material.

Thus, according to various embodiments, the electronic component 100 may exhibit neuromorphic properties. Neuromorphic properties may be based, for example, on the forming of the electrical connection between the input electrodes 104 and the output electrodes 106 (illustratively analogous to neuronal synaptogenesis), and on a plasticity of the at least one electrical connection that is changeable by means of an electrical signal applied to the input electrodes 104 and the output electrodes 106 of the electronic component 100 (illustratively analogous to neuronal plasticity). The electronic component 100 may thus be or become configured, for example, as a neuromorphic chip and/or synaptic connection in so-called brain-computer interfaces.

The signal applied to the input electrodes 106 in operation may be a time-dependent electrical signal. The network 110 may be configured to transform or convert the input signal (as a function of its voltage or current) in a non-linear manner, as illustrated in the conductivity diagram 300 in FIG. 3. Electrical potential may be captured at the output electrodes 104. The signal captured at the output electrodes 104 may be used for machine learning. The machine learning may be, for example, a machine learning method referred to as reservoir computing, echo state network, or liquid state machine.

Polymer molecules or polymer fibers directly connecting an input electrode 106 to an output electrode 104 may carry or pass an electric current during operation of the electronic component 100. The electrical resistance of the individual polymer fibers is linear and proportional to the potential difference between the input electrode and output electrode.

Further, there may be polymer fibers 202 that are branches 202 from other polymer fibers and do not directly contact any of the output electrodes, as illustrated in FIG. 2B. These polymer fibers 202, may be electrically charged by the signal input at the input electrodes 106. The electrical charge of the branches 202 may change the ion distribution or charge carrier distribution in the fluid 108 or in adjacent polymer fibers. As a result, the electrical conductivity in the adjacent polymer fibers may be altered in a nonlinear manner, as illustrated in the conductivity diagram 300 in FIG. 3. The branches 202 may illustratively act as (field effect) gates for the adjacent polymer fibers. In the branches 202, the nonlinearity is strongly pronounced. The nonlinearity of the conductivity may be proportional to the average number and length of branches 202 per polymer fiber.

In other words, the electrically conductive network 110 is configured such that at least one input electrode of the plurality of input electrodes has an electrical connection 110 to, or is electrically conductively connected to, at least a first output electrode and a second output electrode of the plurality of output electrodes. Alternatively or additionally, an electrical connection 110 is formed between at least one first input electrode or a second input electrode of the plurality of input electrodes with at least one output electrode of the plurality of output electrodes.

The one or more electrically conductive polymer fibers may be disposed with a separation above the substrate 102. As an example, the one or more electrically conductive polymer fibers are fully free of physical contact with the substrate 102 in at least a portion thereof.

At least one electrically conductive polymer or polymer fiber of the electrically conductive network 110 that connects an input electrode 106 to an output electrode 104 may include at least one branch 202, the end 202 of which is not electrically connected to any of the output electrodes 104 (as illustrated in FIG. 2B).

According to various embodiments, each of the input electrodes 106 and output electrodes 104 may be electrically isolated from the electrolytic material 108 in sections. For example, one or plurality of regions of the respective electrode 104, 106 may be electrically isolated from the electrolytic material 108 by means of an electrically insulating layer 107. For example, the electrically insulating layer 107 may be or may be applied to the respective region of the electrode 104, 106 that is to be electrically isolated from the electrolytic material 108. Thus, for example, at least one active portion of the respective input electrodes 104 or output electrodes 106 may be defined from which the forming of the electrical connection starts or towards which the electrical connection may grow.

In the following, some detailed aspects are described with reference to the electronic component 100. It is understood that these detailed aspects relate only to exemplary embodiments and that the electronic component 100 may also be designed in other suitable ways.

For example, the substrate 102 may comprise or be formed from a steel foil, steel sheet, a plastic wafer, a plastic film, or a laminate comprising one or more plastic films. The plastic may comprise or be formed from one or more polyolefins (for example, high or low density polyethylene (PE) or polypropylene (PP)). Further, the plastic may comprise or be formed from polyvinyl chloride (PVC), polystyrene (PS), polyester and/or polycarbonate (PC), polyethylene terephthalate (PET), polyethersulfone (PES), polyetheretherketone (PEEK), polytetrafluoroethylene (PTFE), and/or polyethylene naphthalate (PEN). The substrate 102 may comprise one or more of the above materials.

The substrate, according to various embodiments, may comprise or consist of natural polymers, e.g., cellulose, collagen, polylactic acid, gelatin. These natural polymers or other materials may act, for example, as ion conducting materials.

According to various embodiments, the electrolytic material may be provided by a material of the substrate.

The input electrodes 104 and output electrodes 106 may be formed on and/or in the substrate 102. For example, the input electrodes 106 and output electrodes 104 may be disposed in substantially the same plane on and/or in the substrate 102. In some embodiments, the substrate 102 may have a substantially planar surface 102*s*, and the input electrodes 106 and the output electrodes 104 may be or may be directly deposited on the planar surface 102*s*. Alternatively, the input electrodes 106 and the output electrodes 104 may be disposed in different planes on and/or within the substrate 102.

According to various embodiments, the input electrodes 106 and the output electrodes 104 may have a separation of less than 200 μm from each other, e.g., less than 150 μm, less than 100 μm, less than 50 μm, less than 20 μm, or less than 5 μm.

According to various embodiments, a plurality of the input electrodes 106 and/or output electrodes 104 (e.g., more than 25 or more than 100 electrodes) may be provided such that the electrodes are arranged in the form of a grid. For example, the grid may be 2-dimensional or 3-dimensional. The respective adjacent input electrodes or output electrodes may have substantially the same separation from each other. The grid may illustratively be, for example, a square or cubic grid. According to various embodiments, growth of the electrically conductive polymer compounds may occur within a structure that is 3-dimensionally porous.

For example, the input electrodes 106 and the output electrodes 104 may comprise or consist of a metal or metal alloy. For example, the input electrodes 106 and the output electrodes 104 may comprise or consist of aluminum, copper, gold, platinum, silver. Also, for example, the input electrodes 106 and the output electrodes 104 may comprise or consist of silver chloride, platinum, iridium, palladium, nickel, molybdenum, tantalum, tungsten, etc. Also, the input electrodes 106 and the output electrodes 104 may comprise or consist of carbon or a highly conductive polymer (e.g., PEDOT:PSS).

According to various embodiments, the electrolytic material 108 may comprise or consist of a liquid electrolyte, for example, an ionic liquid, a carbonate-based electrolyte, and/or a polymer electrolyte, also known as an ionomer. Alternatively or additionally, the electrolytic material 108 may comprise or consist of porous media immersed in a solution, for example, an ionic porous polymer and/or a porous electrolyte solid.

Further, the electrolytic material has 108 mobile ions. The ions may be, for example, perchlorate ions or other suitable ions. In this regard, the electrolytic material 108 may comprise lithium perchlorate, tetrabutylammonium perchlorate, or other suitable materials, such as sodium chloride, sodium bromide, potassium chloride, copper (II) chloride, copper sulfate, sodium iodide, and so forth.

For example, the electrolytic material 108 may be disposed in a space region 105 between the input electrodes 106 and output electrodes 104 at least during the method of fabricating the electronic component 100. In this regard, the input electrodes 106 and the output electrodes 104 may be at least partially in physical contact with the electrolytic material 108.

The electrolytic material 108 may, according to various embodiments, comprise a polymerizable polymer. In this regard, the polymerizable material may be a monomer of an intrinsically electrically conductive polymer. For example, the monomer may be polymerized to form an electrically conductive polymer. For example, the monomer may comprise or be 3,4-ethyleneedioxythiophene. The intrinsically conductive polymer in this case may have or be poly(3,4-ethylenedioxythiophene).

Alternatively or additionally, the polymerizable material may be a monomer of a doped polymer. In this case, the monomer may be converted to a doped polymer by polymerization.

Figure 6A:
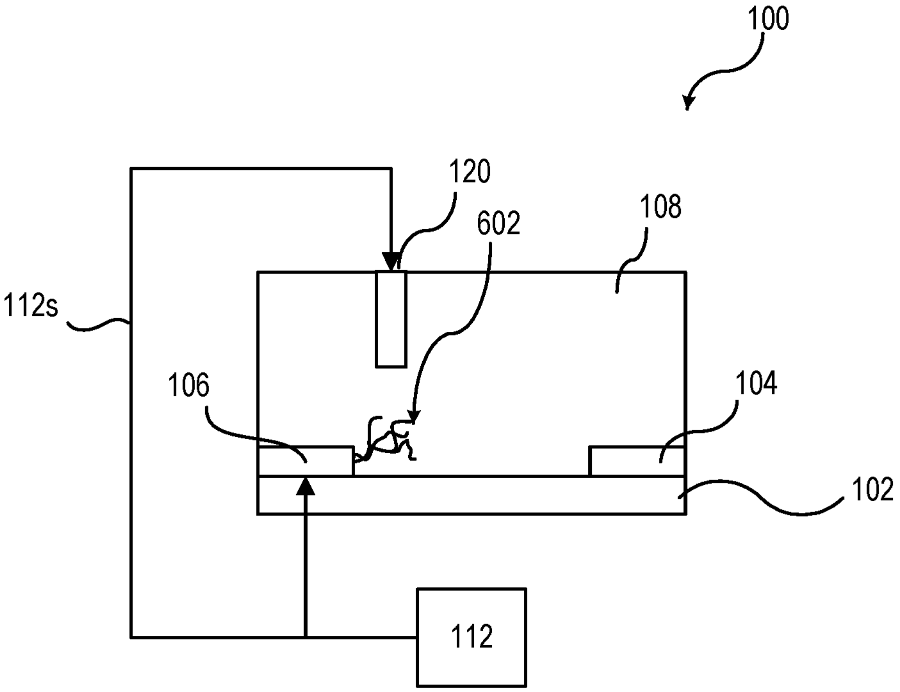
FIGS. 6A, 6B and 6C show schematic views of a method of manufacturing an electronic component, according to various embodiments.
Figure 6B:
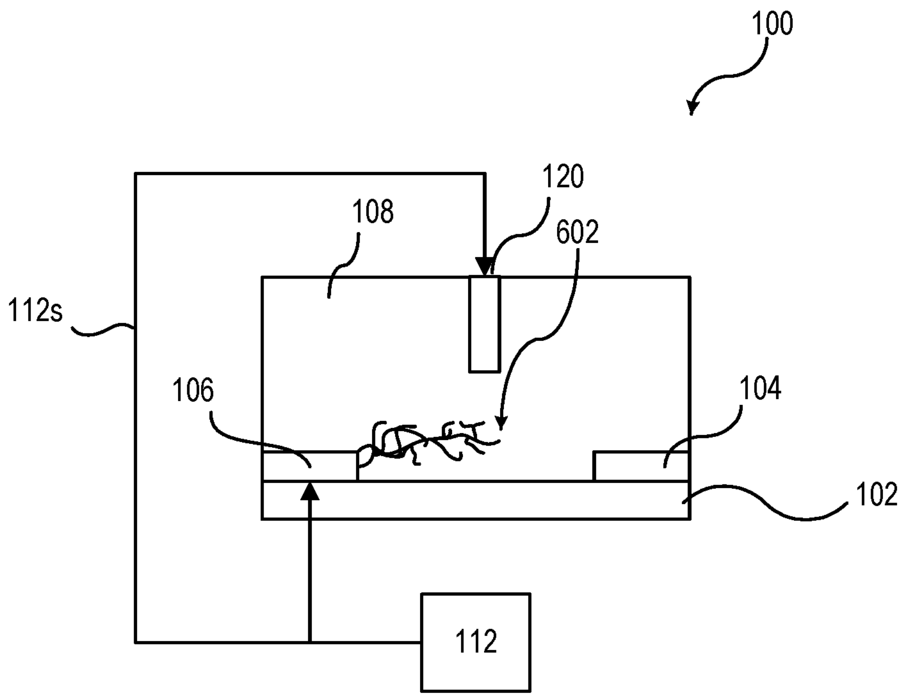
Figure 6C:
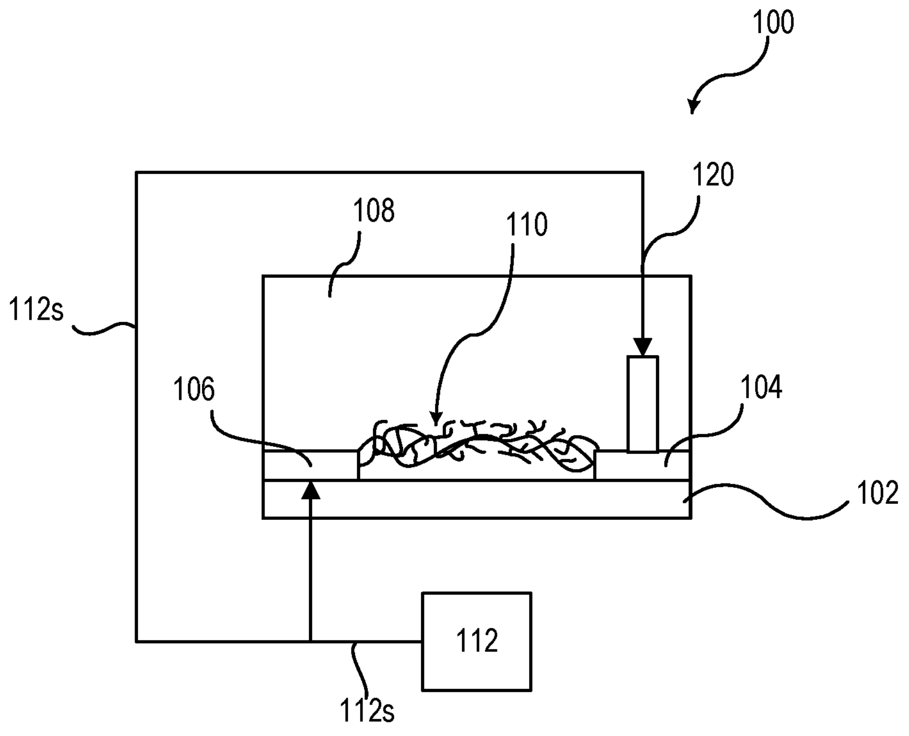

As FIG. 6A-FIG. 6C illustrates, the electronic component 100 may include a control device 112. The control device 112 may be coupled to the input electrodes 106 and the floating electrode 120 for providing an electrical signal to the input electrodes 106 and output electrodes 104.

According to various embodiments, the control device 112 may be configured to move the electronic component 100 from the first operating state 100*a* to the second operating state 100*b* using the provided electrical signal 112*s*. This may be done by means of polymerizing the at least one polymerizable material to form the electrically conductive polymer. In this regard, the provided electrical signal 112*s* may have an amplitude in a range from about 20 mV to about 5 V, for example, in a range from about 50 mV to about 2 V.

According to various embodiments, the provided electrical signal 112*s* may have a time-varying electrical voltage, such as an AC voltage, a pulsed DC voltage, and/or a pulsed bipolar voltage.

For example, the control device 112 may be configured such that the time-varying electrical voltage has a frequency in a range from about 10 Hz to about 10 kHz, e.g., in a range from about 5 Hz to about 5 kHz, e.g., in a range from about 2 Hz to about 2 KHz. According to various embodiments, the control device 112 may be configured such that the time-varying electrical voltage is a periodic electrical voltage having a period in a range from about 0.01 ms to about 0.1 s, e.g., in a range from about 0.5 ms to about 50 ms.

For example, the control device 112 may be configured such that the time-varying electrical voltage has a duty cycle (also referred to as turn-on time) in a range from about 10% to about 50%, for example, in a range from about 20% to about 40%.

For example, the control device 112 may be configured such that the time-varying electrical voltage has a bandwidth in a range from about 10 Hz to about 10 kHz, e.g., in a range from about 5 Hz to about 5 kHz, in a range from about 2 Hz to about 2 kHz.

According to various embodiments, polymerization of the at least one polymerizable material may only occur when the applied electrical voltage is above a threshold electrical voltage. Thus, the monomers may oxidize, for example, and the radical cations necessary or helpful for the chemical reaction may be formed. The threshold electrical voltage may depend on the design of the input electrodes 106 and output electrodes 104. For example, the electrical threshold voltage may be a function of the separation present between the input electrodes 104 and the output electrodes 106, and/or a function of the characteristics of the electrical signal provided, such as a function of pulse frequency. As an example, if the electrodes are spaced 200 μm apart and the pulse frequency is in a range of about 10 Hz to about 10 kHz, the electrical threshold voltage may be in a range of about 20 mV to about 5 V.

As exemplified in FIG. 1A, the electrolytic material 108 may be substantially free of the electrically conductive polymer interconnect in the first operating condition 100*a*. For example, the electronic component 100 may be free of a continuous polymer structure that electrically conductively and physically connects the input electrodes 106 to the output electrodes 104. The first operating state 100*a* of the electronic component 100 may illustratively be an unprogrammed state of the electronic component 100. In this regard, the polymerizable material in the electrolytic material 108 may be substantially in the form of monomers. The electrolytic material 108 may also comprise polymers of the polymerizable material, wherein the polymers may be present in the electrolyte material 108 in soluble and/or insoluble form, but do not interconnect the input electrodes 106 and the output electrodes 104.

As exemplified in FIG. 1B, the electronic component 100 may include at least one electrical connection in the second operating state 100*b*. For example, the electronic component 100 may include a structure that electrically conductively and physically connects the input electrodes 106 to the output electrodes 104. Illustratively, the second operating state of the electronic component 100 may be a programmed state of the electronic component 100. Here, the electrolytic material 108 has the electrically conductive polymer that may form the electrical connection. The electrical connection is at least partially insoluble in the electrolytic material 108 and is substantially surrounded by the electrolytic material 108, for example. The electrical connection may be or may be formed by means of electropolymerizing, for example by means of field-directed polymerizing, the at least one polymerizable material of the electrolytic material 108 to the electrically conductive polymer. Also, in the second operating condition, the electrolyte material 108 may further comprise the polymerizable material and polymers of the polymerizable material that are different from the electrically conductive polymer, wherein the different polymers may be included in the electrolyte material 108 in soluble and/or insoluble form. Illustratively, the at least one electrical compound may be or may be formed from a portion of the total amount of polymerizable material.

According to various embodiments, the electrically conductive polymer may comprise or consist of one or more fiber structures. In this regard, the one or more fiber structures may be, for example, reticulated or at least single or multiple branched. For example, the one fiber structure may have one or more strands, the one or more strands extending from the input electrodes 106 to the output electrodes 104. Illustratively, the electrically conductive polymer of the electrically conductive connection of an input electrode 106 to an output electrode 104 is a polymeric fiber structure (also referred to as a polymeric fiber structure or an electrically conductive fiber structure). For example, a polymer fiber is illustrated in FIG. 1B. The electrically conductive network of a plurality of fiber structures is illustrated in FIG. 2A and FIG. 2B. A single fiber structure typically has an average diameter in a range from about 1 μm to about 50 μm, for example in a range from about 3 μm to about 10 μm. A polymer fiber is essentially a straight-line electrical connection from an input electrode 106 to an output electrode 104 compared to a branched polymer network, which illustratively has a sponge-like structure with polymer interconnects intertwined or looped in the nm range. Thus, illustratively, the polymer fibers are thicker than polymer interconnects in a polymer coating and have higher directionality (no or less branching and looping).

The physical properties (e.g., electrical conductivity) of the at least one interconnect may be defined by, for example, the length and/or thickness of the one or more fiber structures of the at least one electrical interconnect, the number of fiber structures, the degree of branching of the one or more fiber structures, and/or the directionality of the one or more fiber structures. It should be understood that "directionality" means the direction in which the one or more fiber structures extend in the electrolytic material 108, and whether the one or more fiber structures are substantially grown from one of the input electrodes 106 and output electrodes 104, as illustrated in FIG. 6A-FIG. 6C.

In this regard, the control device 112 may be configured to provide an electrical voltage between one or more input electrodes 106 and the floating electrode 120 (see FIG. 6A-FIG. 6C) such that the electrical voltage is used to form the electrically conductive polymer of the at least one electrical connection from the at least one polymerizable material of the electrolytic material 108. Illustratively, polymerizing the at least one polymerizable material of the electrolytic material 108 may be performed such that the electronic component 100 is placed in the second operating state 100*b*.

Further, the electrical signal 112*s* provided by the control device 112 may affect the physical and electrical properties of the at least one electrical connection.

According to various embodiments, the electrically conductive polymer may be at least partially free of physical contact with the substrate 102. For example, the at least one electrical connection may be fully surrounded by electrolytic material 108.

According to various embodiments, the electrolytic material 108 may comprise mobile ions for providing short-term plasticity of the at least one electrical connection. For example, the mobile ions may penetrate the electrically conductive polymer such that the electrical connection is doped. Alternatively, the ions may, for example, attach to the electrically conductive polymer such that the electrical connection is affected. This enables, for example, a change in the physical and/or electrical properties of the at least one electrical connection.

Alternatively, or in addition, the electrolytic material 108 may be configured, for example, such that the electronic component 100 may be brought from the second operating state 100*b* to the first operating state 100*a* or other further state by means of the provided electrical signal 112*s* of the control device 112. In this case, the electrolytic material 108 may comprise, for example, a material, such as an enzyme and/or a chemical compound, suitable for at least partially degrading the electrical connection by means of the provided electrical signal of the control device 112.

Figure 4:
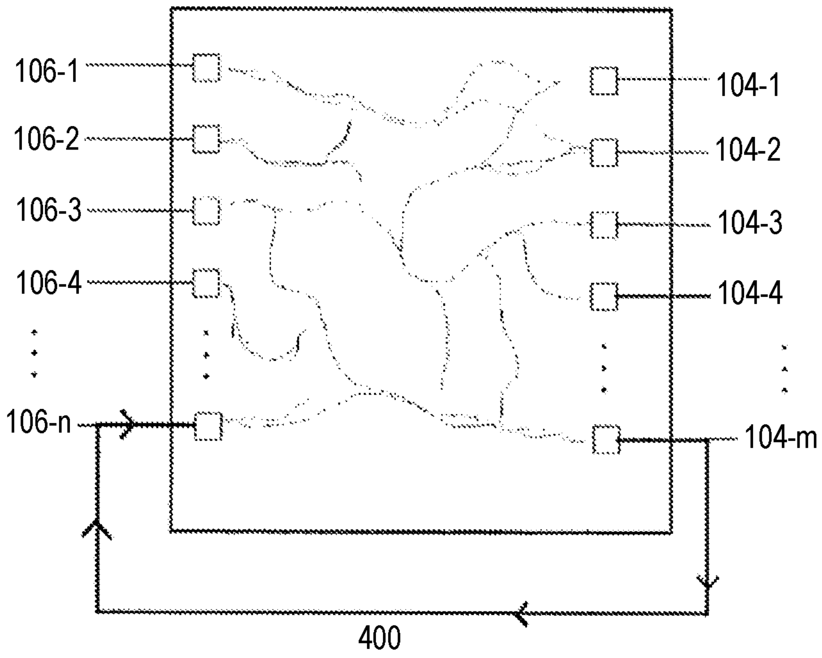
FIG. 4 shows a schematic view of an electronic component, according to various embodiments.

In various embodiments, the electronic component 100 includes a feedback channel 400. The feedback channel 400 is adapted to electrically connect at least one output electrode to an input electrode, as illustrated in FIG. 4. By means of the feedback channel 400, a recurrent neural network may be realized, for example for so-called reservoir computing or for so-called spiking neural networks.

In various embodiments, an artificial neural network comprises one or plurality of electronic components 100. The artificial neural network may be configured to perform at least one computational function using the one electronic component 100 or using the plurality of electronic components 100.

Figure 5:
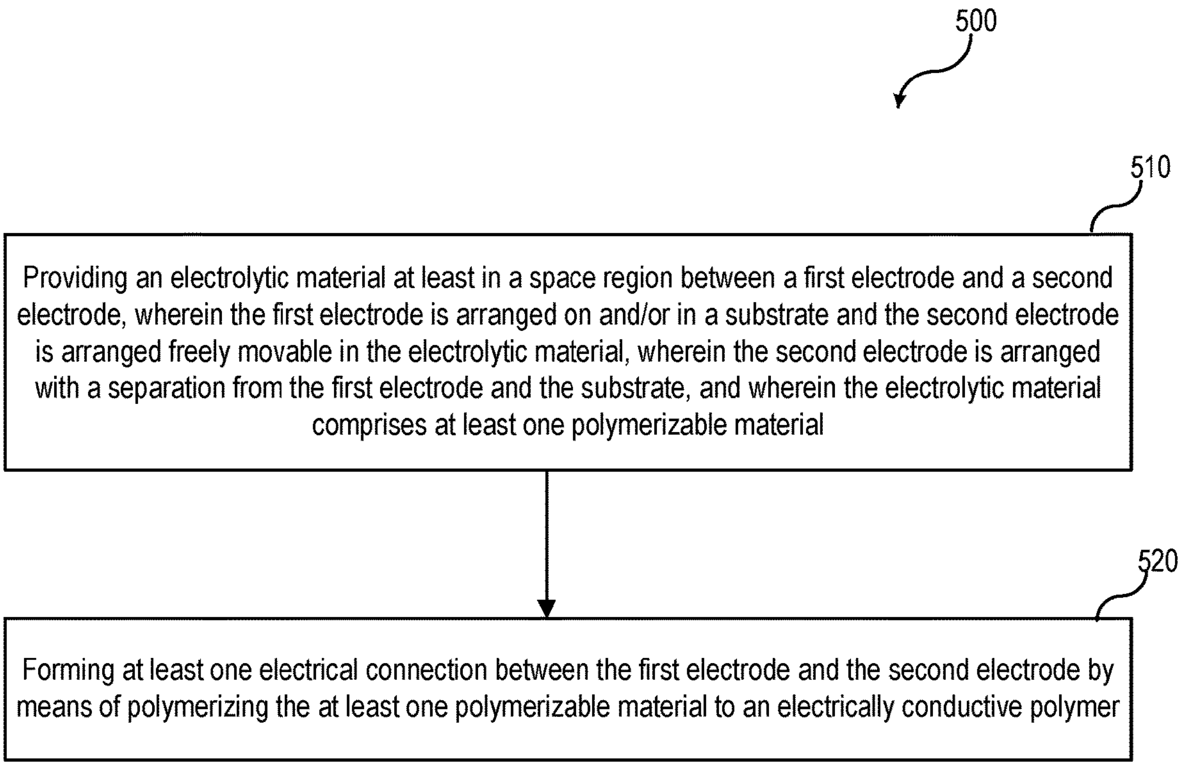
FIG. 5 shows a schematic flowchart of a method for manufacturing an electronic component, according to various embodiments.

FIG. 5 illustrates a schematic flowchart of a method for manufacturing an electronic component, according to various embodiments.

In various embodiments, a method of fabricating 500 an electronic component comprises providing 510 an electrolytic material 108 at least in a space region between a first electrode and a second electrode, wherein the first electrode is disposed on and/or in a substrate 102 and the second electrode is freely movable in the electrolytic material. The second electrode may be disposed with a separation from the first electrode and the substrate. The electrolytic material 108 may comprise at least one polymerizable material. The method 500 may further comprise forming 520 at least one electrical connection between the first electrode and the second electrode by polymerizing the at least one polymerizable material into an electrically conductive polymer. The formed polymer may contact the second electrode 120 in the process. When the second electrode 120 is then moved within the electrolytic material 108, the polymer breaks away from the second electrode 120. Alternatively, the second electrode 120 may be moved before the formed polymer reaches the second electrode 120.

It is understood that the method of manufacturing an electronic component may include one or more functions described herein with reference to the electronic component or a portion of the electronic component (for example, the control device), and vice versa. For example, the method of making 500 the electronic component enables repeated programming of the electronic component with different neuromorphic properties.

The method 500 may further comprise moving the second electrode in the electrolytic material so as to increase the separation from the first electrode, thereby increasing the spatial extent of the electrically conductive polymer. The spatial extent is increased by the polymer growth or the direction of growth of the polymer following the direction of movement of the second electrode 120.

The method 500 may further comprise moving the second electrode to a third electrode disposed on and/or in a substrate 102 and with a separation from the first electrode. The second electrode may electrically contact the third electrode such that the electrically conductive polymer forms an electrical connection between the first electrode and the third electrode. The second electrode may contact the third electrode outside of the electrolytic material. Alternatively or additionally, the second electrode may contact the third electrode outside of the electrolytic material. The forming 520 of the at least one electrical connection may be accomplished by applying an electrical signal between at least the output electrodes 104 and the input electrodes 106.

The forming 520 of the at least one electrical connection between the first electrode and the second electrode may comprise forming a single fiber structure by polymerizing the at least one polymerizable material. The fiber structure may have physical contact with the first electrode.

In various embodiments, the electrolytic material 108 may have a first conductivity and the at least one electrical compound may have a second conductivity, wherein the first electrical conductivity may be less than the second electrical conductivity, for example. In various embodiments, the method 500 may further comprise depolymerizing and/or disentangling the electrically conductive polymer into a depolymerized and/or disentangled polymerizable material by supplying energy. In this regard, the energy supply may be by means of supplying thermal energy and/or by means of supplying electromagnetic radiation.

Disentanglement of the electrically conductive polymer may be understood, for example, as the disentanglement of a fiber consisting of multiple interwoven polymer chains, which illustratively may be understood as a kind of glass transition in polymers.

FIG. 6A, FIG. 6B and FIG. 6C show a schematic view of an electronic component 100 during its manufacture, according to various embodiments.

According to various embodiments, the electronic component 100 may further comprise at least one additional electrode 120 (also referred to as a floating electrode or second electrode) in addition to the output electrodes 104 and the input electrodes 106.

The electrically conductive network 110 may be formed by applying an AC signal across one of the input electrode 106 (also referred to as the first electrode) or the output electrode 104 (also referred to as the third electrode) and a floating electrode 120 (also referred to as the second electrode), as illustrated in FIG. 6A, FIG. 6B and FIG. 6C. The electrodes 106, 104, 120 are thereby surrounded by an electrolytic material 108 that includes a material polymerizable by the AC signal. The polymerizable material is electrically conductive when polymerized. For example, the polymerizable material is a monomer, such as 3,4-ethyleneedioxythiophene (EDOT), and the electrically conductive polymer formed therefrom is, for example, poly-3,4-ethyleneedioxythiophene (PEDOT).

The free-moving second electrode 120 is guided in the electrolytic material, while the AC signal is applied across the first and second electrodes 106, 120, from the first electrode 106 to the third electrode 104 (illustrated in FIG. 6A-6C) to form the electrical connection through the electrically conductive polymer. The AC signal is configured, for example with respect to the applied voltage, to oxidize the monomer (for example EDOT) and trigger or initiate polymerization between the first and second electrodes 106, 120. As a result, the electrically conductive polymer grows by electropolymerization on or over the surface 102*s* of the substrate 102 in the direction of the free-moving second electrode 120 (see FIG. 6A, 6B). In other words, the direction of growth of the growing polymer follows the direction of movement of the second electrode in the electrolytic material 108.

To form a continuous or contiguous electrical connection, the second electrode 120 may contact the third electrode 104 or, alternatively, be positioned closely adjacent thereto to allow the electrically conductive polymer to connect to the third electrode 104 (see FIG. 6C). In this case, the AC signal is present across the first electrode 106 and the third electrode 104 by means of the second electrode.

The shape of the network 110 may be influenced by the motion profile or motion of the second electrode 120. For example, a precisely formed network 110 may be formed in the electrolytic material by a precisely set or pre-programmed movement of the second electrode 120. Alternatively, if a random network 110 is required for the specific application, the second electrode 120 may be manually or automatically randomly guided through the electrolytic material 108.

The second electrode 120 may further be configured, for example, in a manner analogous to the shape and control of the measuring needle of an atomic force microscope, for example, with respect to the arrangement of a needle on a flexure spring, vibration damping, and distance control from the substrate. However, the second electrode 120 (for example, the needle-shaped portion) may have a larger spatial extent, for example, in the range of a few μm to mm, than the conventional measuring needle on the flexure spring for an atomic force microscope.

In various embodiments, the electrolytic material 108 may be removed after the network 110 has been formed. Illustratively, the network 110 may thus remain dry on the substrate 102. Optionally, another liquid, gel, or resin may be applied to enclose the network. This may be used to adjust the electrical conductivity and mechanical and optical stability (for example, with respect to electro-degradation and/or photodegradation) of the network 110.

When the electronic component 100 is in a first operating state 100*a*, see for example FIG. 1A, an electrolytic material 108 may be disposed in at least a space region between the input electrodes 106 and output electrodes 104. The electrolytic material 108 may comprise at least one polymerizable material. According to various embodiments, the electrolytic material 108 may comprise an electrolyte solution, and the polymerizable material may be dissolved and/or dispersed in the electrolyte solution. According to various embodiments, the electrolytic material 108 may comprise a carrier liquid, wherein the electrolyte may be dissolved and/or dispersed in the carrier liquid, and wherein the polymerizable material may also be dissolved and/or dispersed in the carrier liquid. In various embodiments, a plurality of free-moving electrodes 102 may be provided to form a plurality of polymer fibers, each connecting an input electrode to an output electrode.

According to some embodiments, forming the at least one electrical connection may be performed as follows:

For example, an electrical voltage of less than 2 V may be used. A lower electric voltage (e.g., of −1 V) may further be applied to one or a plurality of electrodes to control the electric field and/or salt distribution in the electrolytic material, and thus the directionality of polymerization. This allows, for example, forming of multiple compounds and triggering their growth with external stimuli.

The artificial neural network formed from an electrically conductive polymer may illustratively resemble, for example, the dendritic topology of a synapse, and the growth may be comparable to a synaptogenetic process.

The alternating current (AC) signal may be in a range of about 1 V to about 6 V and may be or be applied to the at least two electrodes, wherein the at least two electrodes are in contact with a solution containing:

Acetonitrile (MeCN), 1 mM sodium tetrabutylammonium hexafluorophosphate (TBAPF6), and 50 mM 3,4-ethylenedioxythiophene-(EDOT).

For example, polymerization may lead to the formation of poly-3,4-ethyleneedioxythiophene (PEDOT) fibers doped with hexafluorophosphate $PF6^-$.

The amplitude of the electrical signal, according to various embodiments, may have little effect on the formation of the at least one electrical connection, provided enough electrical voltage is provided to support oxidative polymerization in PEDOT.

However, the frequency of the electrical signal may have a significant impact on the formation of the at least one electrical connection. For example, it has been recognized that there is a strong correlation between frequency and degree of branching of the at least one electrical connection 100, as shown for example in FIG. 2. Frequencies greater than 200 Hz, for example, may result in the formation of higher branched electrical connections, where an increase in the period of the AC voltage may reduce the branches and increase the cross-sectional area of the at least one electrical connection.

These variations in the physical and electrical properties of the at least one electrical compound may result, for example, from the interrelated dynamics of motion of the monomers and the ions from the electrolytic material. For example, the monomers may be affected by the electrical voltage and the ions may be subject to Brownian motion.

According to various embodiments, the polymerization reaction may be triggered, for example, by oxidizing the monomer, forming doped oligomers stabilized with $PF6^-$, which in turn may react with already formed PEDOT fibers. The presence of the electrolytic material and the local, e.g., positive voltage, which is larger than the oxidation potential of the monomer, may be helpful to realize the electrochemical reaction. Illustratively, ions may collect at the interface between at least one input electrodes and at least one output electrodes and the electrolytic material with a certain resistance-capacitor time ("RC-time"). For example, a longer time duration allows more reactions to occur at the extremities of the fibers. This may lead to wider fibers. During the following cathodic moment, only the newly formed extremities of the fibers may become reactive. This effect offers, for example, the possibility of controlling the conductivity of the at least one electrical connection made of electrically conductive polymer by means of structural changes.

The following are some examples that relate to what is described herein and shown in the figures.

Example 1 is an electronic component comprising: a substrate, the substrate having a plurality of input electrodes and a plurality of output electrodes disposed on and/or in the substrate with a separation from one another; and an electrically conductive network of one or more electrically conductive polymers, the electrically conductive network configured to electrically crosslink the plurality of input electrodes to the plurality of output electrodes.

The electrically conductive network may in each case comprise at least one fiber structure of the one electrically conductive polymer or the plurality of electrically conductive polymers extending from at least one input electrode to at least one output electrode.

The fiber structure may have an average diameter in a range from about 1 μm to about 50 μm, for example in a range from 3 μm to 10 μm.

The fiber structure may have a substantially rectilinear structure.

In example 2, the electronic component of example 1 may optionally further comprise an electrolytic material disposed at least partially in the chamber between the plurality of input electrodes and the plurality of output electrodes, wherein at least a portion of the electrically conductive network is disposed in the electrolytic material.

In example 3, the electronic component according to example 1 or 2 may optionally further comprise at least one electrically conductive polymer of the electrically conductive network connecting an input electrode to an output electrode having at least one branch, the end of which is not electrically connected to any of the output electrodes.

In example 4, the electronic component of example 3 may optionally further comprise the branch being directed toward another electrically conductive polymer of the electrically conductive network.

In example 5, the electronic component according to any of examples 1 to 4 may optionally further comprise: at least one input electrode of the plurality of input electrodes; and at least a first output electrode and a second output electrode of the plurality of output electrodes; wherein the input electrode has an electrical connection to the first and second output electrodes.

In example 6, the electronic component according to any one of examples 1 to 5 may optionally further comprise: at least a first input electrode and a second input electrode of the plurality of input electrodes; and at least an output electrode of the plurality of output electrodes, the first and second input electrodes having an electrical connection to the output electrode.

In example 7, the electronic component according to any of examples 1 to 6 may optionally further comprise a feedback channel adapted to electrically conductively connect at least one output electrode to an input electrode.

In example 8, the electronic component according to any of examples 1 to 7 may further optionally comprise one or more electrically conductive polymer fibers of the electrically conductive polymer disposed with a separation above the substrate.

In example 9, the electronic component of example 8 may optionally have one or more electrically conductive polymer fibers fully free of physical contact with the substrate in at least a portion thereof.

In example 10, the electronic component according to any of examples 1 to 9 may optionally be configured as a neuromorphic chip and/or a synaptic connection in a brain-computer interface.

Example 11 is an artificial neural network, comprising: one or more electronic components according to any one of examples 1 to 10, wherein the artificial neural network is configured to perform at least one computational function by means of the one electronic component or by means of the plurality of electronic components.

Example 12 is a method of manufacturing an electronic component, the method comprising: providing an electrolytic material at least in a space region between a first electrode and a second electrode, wherein the first electrode is arranged on and/or in a substrate and the second electrode is arranged freely movable in the electrolytic material, wherein the second electrode is arranged with a separation from the first electrode and the substrate, and wherein the electrolytic material comprises at least one polymerizable material, forming at least one electrical connection between the first electrode and the second electrode by means of polymerizing the at least one polymerizable material to an electrically conductive polymer.

In example 13, the method according to example 12 may optionally further comprise: Moving the second electrode in the electrolytic material so as to increase the separation from the first electrode, thereby increasing the spatial extent of the electrically conductive polymer.

In example 14, the method according to example 12 or 13 may further optionally comprise: Moving the second electrode to a third electrode disposed on and/or in a substrate and with a separation from the first electrode, wherein the second electrode electrically contacts the third electrode such that the electrically conductive polymer forms an electrical connection between the first electrode and the third electrode.

In example 15, the method of example 14 may optionally comprise the second electrode contacting the third electrode outside the electrolytic material or the second electrode contacting the third electrode inside the electrolytic material.

In example 16, the method according to any of examples 12 to 15 may optionally comprise forming the at least one electrical connection by means of applying an electrical signal between at least the first electrode and the second electrode.

In example 17, the method of any of examples 12 to 16 may optionally comprise forming the at least one electrical connection between the first electrode and the second electrode comprising forming a single fiber structure by polymerizing the at least one polymerizable material, the fiber structure having physical contact with the first electrode.

In example 18, the method of any of examples 14 to 17 may optionally comprise forming the at least one electrical connection between the first electrode and the third electrode comprising forming a single fiber structure by polymerizing the at least one polymerizable material, the fiber structure having physical contact with the first and third electrodes.

In example 19, the method according to any one of examples 12 or 18 may optionally comprise repeating the steps according to any one of examples 12 to 18 for at least one or more additional input electrodes and one or more output electrodes such that an electrically conductive network having the plurality of electrical connections is formed between the plurality of input electrodes and the plurality of output electrodes.

In example 20, the method of example 19 may optionally further comprise a machine learning of the electrical network, wherein one or more predetermined signals are applied to one or more input electrodes and in response one or more signals are ascertained at one or more output electrodes, wherein the machine learning is a machine learning method referred to as reservoir computing, echo state network, or liquid state machine.

The invention claimed is:

1. An electronic component comprising:

a substrate, the substrate having a plurality of input electrodes, a plurality of output electrodes disposed on and/or in the substrate with a separation from each other and at least one additional electrode; and an electrically conductive network of one or more electrically conductive polymers, wherein the electrically conductive network is configured to electrically cross-link the plurality of input electrodes to the plurality of output electrodes, wherein the electrically conductive network in each case comprises at least one fiber structure of the one or more electrically conductive polymers extending from at least one input electrode of the plurality of input electrodes to at least one output electrode of plurality of output electrodes;

wherein the electrically conductive network is formed by applying an alternative current signal between the at least one input electrode of the plurality of input electrodes and the additional electrode, and by guiding the additional electrode in an electrolytic material from the input electrode to the output electrode;

wherein the electrolytic material includes a material polymerizable by the alternating current signal.

2. The electronic component according to claim 1, wherein the fiber structure has an average diameter in a range of about 1 μm to about 50 μm.

3. The electronic component according to claim 1, wherein the fiber structure has a substantially rectilinear structure.

4. The electronic component according to claim 1, the electronic component further comprising:

an electrolytic material disposed at least partially in a chamber between the plurality of input electrodes and the plurality of output electrodes, wherein at least a portion of the electrically conductive network is disposed in the electrolytic material.

5. The electronic component according to claim 1, wherein at least one electrically conductive fiber structure of the electrically conductive network connecting an input electrode to an output electrode has at least one branch, the end of which is not electrically connected to any of the output electrodes.

6. The electronic component according to claim 5, wherein the branch is directed toward another electrically conductive fiber structure of the electrically conductive network.

7. The electronic component according to claim 1, the electronic component further comprising:

at least one input electrode of the plurality of input electrodes; and at least a first output electrode and a second output electrode of the plurality of output electrodes, wherein the input electrode has an electrical connection to the first output electrode and the second output electrode.

8. The electronic component according to claim 1, the electronic component further comprising:

at least a first input electrode and a second input electrode of the plurality of input electrodes; and at least one output electrode of the plurality of output electrodes, wherein the first input electrode and the second input electrode have an electrical connection to the output electrode.

9. The electronic component according to claim 1, the electronic component further comprising:

a feedback channel adapted to electrically conductively connect at least one output electrode to an input electrode.

10. The electronic component according to claim 1, wherein one or more electrically conductive fiber structures of the electrically conductive polymer are disposed with a separation above the substrate.

11. The electronic component according to claim 10, wherein one or more electrically conductive fiber structures is/are fully free of physical contact with the substrate in at least a portion thereof.

12. The electronic component according to claim 1, wherein the electronic component comprises a neuromorphic chip and/or a synaptic connection in a brain-computer interface.

13. A method of manufacturing an electronic component, the method comprising:

providing an electrolytic material at least in a space region between a first electrode and a second electrode, wherein the first electrode is arranged on and/or in a substrate and the second electrode is arranged freely movable in the electrolytic material, wherein the second electrode is arranged with a separation from the first electrode and the substrate, and wherein the electrolytic material comprises at least one polymerizable material; and forming at least one electrical connection between the first electrode and the second electrode by polymerizing the at least one polymerizable material into an electrically conductive polymer;

guiding the second electrode in the electrolytic material so as to increase the separation from the first electrode, thereby increasing the spatial extent of the electrically conductive polymer.

14. The method according to claim 13, the method further comprising:

guiding the second electrode to a third electrode disposed on and/or in a substrate and with a separation from the first electrode, wherein the second electrode electrically contacts the third electrode such that the electrically conductive polymer forms an electrical connection between the first electrode and the third electrode.

15. The method according to claim 14, wherein the second electrode contacts the third electrode outside the electrolytic material; or wherein the second electrode contacts the third electrode within the electrolytic material.

16. The method according to claim 13, wherein forming the at least one electrical connection is performed by applying an electrical signal between at least the first electrode and the second electrode.

17. The method according to claim 13, wherein forming the at least one electrical connection between the first electrode and the second electrode comprises forming a single fiber structure by polymerizing the at least one polymerizable material, the fiber structure having physical contact with the first electrode; or wherein forming the at least one electrical connection between the first electrode and the third electrode comprises forming a single fiber structure by polymerizing the at least one polymerizable material, the fiber structure having physical contact with the first and third electrodes.

18. The method according to claim 13, further comprising:

repeating the steps of claim 14, for at least one or more additional input electrodes and one or more output electrodes, such that an electrically conductive network having the plurality of electrical connections is formed between the plurality of input electrodes and the plurality of output electrodes; and machine learning the electrical network, wherein one or more predetermined signals are applied to one or more input electrodes and, in response, one or more signals are ascertained at one or more output electrodes.

* * * * *